No. 811,188. PATENTED JAN. 30, 1906.
J. B. WARING.
FLUID LEVEL CONTROLLING MEANS.
APPLICATION FILED MAR. 11, 1904.
2 SHEETS—SHEET 1.
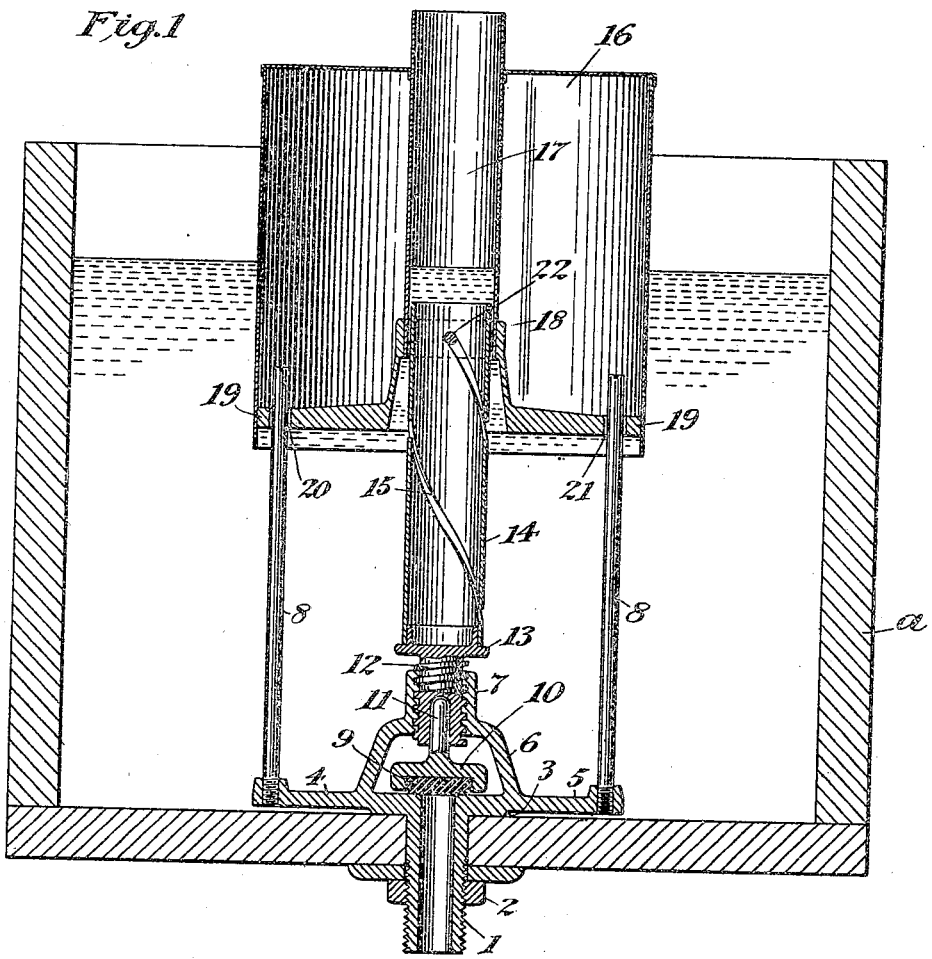
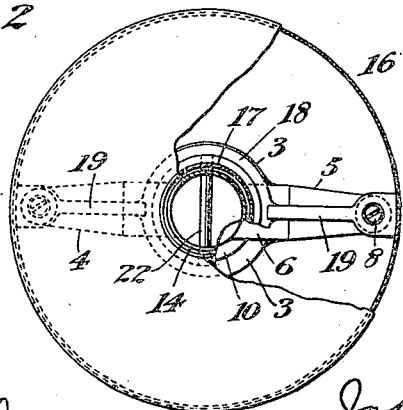
Witnesses:
Albert V. T. Day
Henry Barnes
Inventor:
John B. Waring
By Henry L. Williams
Atty.

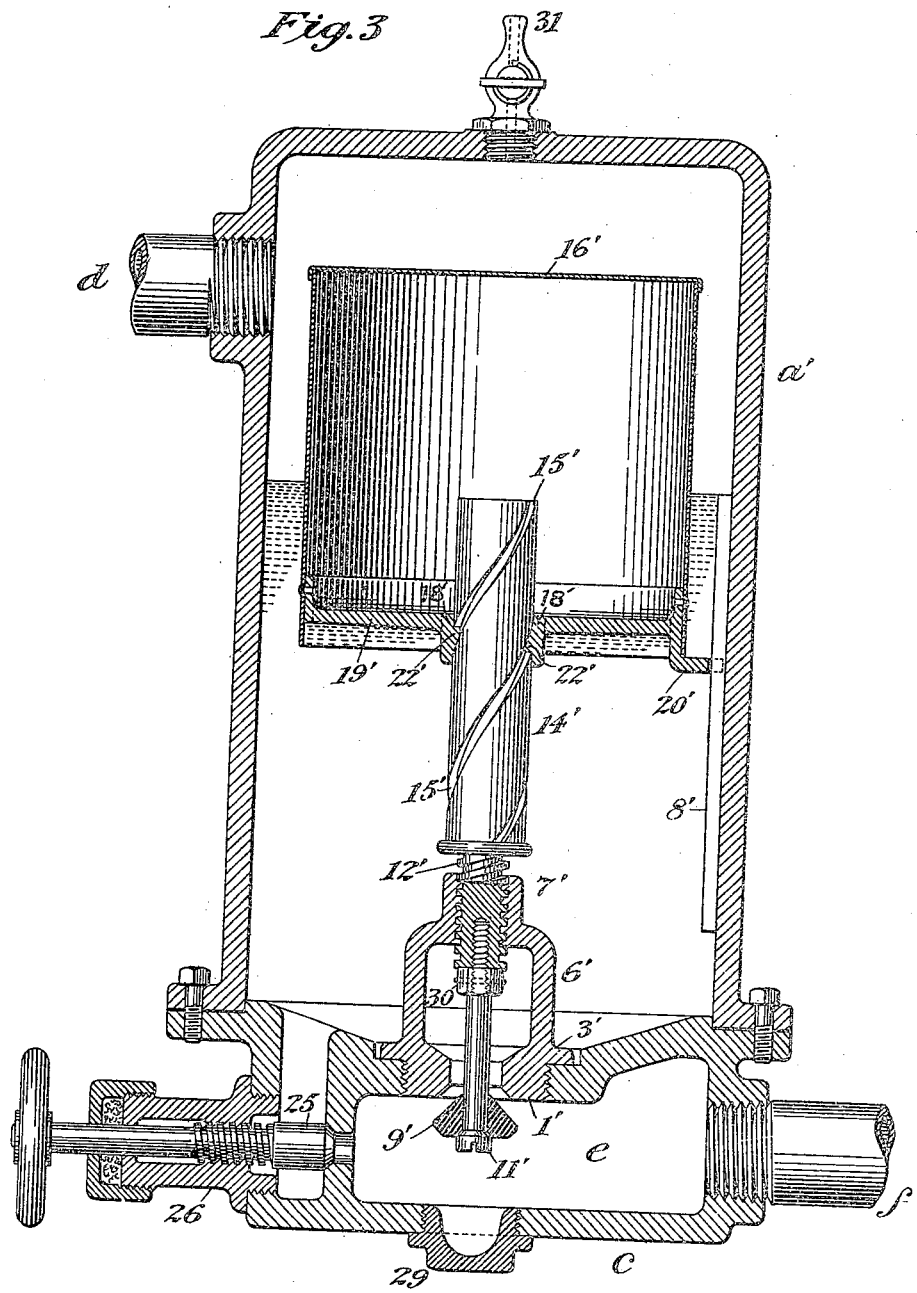

UNITED STATES PATENT OFFICE.

JOHN B. WARING, OF EAST ORANGE, NEW JERSEY, ASSIGNOR TO WARING PATENTS COMPANY, OF NEW YORK, N. Y., A CORPORATION OF NEW YORK.

FLUID-LEVEL-CONTROLLING MEANS.

No. 811,188.  Specification of Letters Patent.  Patented Jan. 30, 1906.

Application filed March 11, 1904. Serial No. 197,734.

*To all whom it may concern:*

Be it known that I, JOHN B. WARING, a citizen of the United States, residing at East Orange, in the county of Essex and State of New Jersey, have invented certain new and useful Improvements in Fluid-Level-Controlling Means, of which the following is a specification, reference being had therein to the accompanying drawings, forming a part thereof.

My invention relates to fluid-level-controlling means such as are employed in water-closet flush-tanks and in steam-traps, and has for its objects generally simplicity and compactness of construction and ease and reliability of operation.

My invention includes the employment of a float member and means for guiding the same so as to restrain rotative movement thereof and of a rotatable valve member, these members having a helical engagement, so that the rise and fall of the float member will cause rotative movement of the valve member.

My invention also includes the employment of a hollow inverted float member and of a valve member arranged to telescope or enter within the hollow float member and controlled by the rise and fall of the valve member.

My invention also includes various improvements in the construction of the parts and in combinations thereof.

I will now describe the devices illustrated in the accompanying drawings and embodying my invention and will thereafter point out my invention in claims.

Figure 1 is a vertical central section of a flush-tank and fluid-level-controlling means therein embodying my invention. Fig. 2 is a plan view of the controlling means, partly broken away. Fig. 3 is a vertical central section of a steam-trap and fluid-level-controlling means therein embodying my invention.

In the flush-tank embodiment of my invention shown in Figs. 1 and 2 an ordinary water-closet reservoir or flush-tank $a$ is provided with an inlet or supply-tube 1, which is exteriorly clamped by a nut 2, bearing against a washer to afford a large bearing-surface on the under side of the tank and provided on its upper end or the end within the tank with an annular surface 3, bearing on the bottom of the tank, and with radially-projecting arms 4 and 5, these arms being also connected by a bridge-piece 6, having thereon a threaded socket 7, which is located directly above the inlet-tube and in which a part of the movable valve member operates. The radial arms 4 and 5 are provided with guide-rods 8, which extend upward and guide the rise and fall of the float member. The valve member comprises a valve-face 9, of a flexible or elastic material, which is forced into a recess in the valve-disk 10. The disk is provided with a stem 11, which is carried by and is free to rotate in the threaded lower end 12 of the valve member, this threaded lower end engaging the threaded socket 7 of the bridge-piece 6. The valve member also has a tubular part 14 above its threaded lower end, and this tubular part is provided with two diametrically opposite helical slots 15 of large pitch. The float member comprises a hollow cylindrical inverted cup 16, which is provided with a central penetrating-tube 17, open at the top to the atmosphere and tightly secured to the upper face of the inverted cup 16 and secured at its lower end to an annular sleeve 18. From the lower part of this sleeve 18 radial arms 19 extend to the sides of the cup, and guide-holes 20 and 21 are formed in these radial arms, and the guide-rods 8 penetrate these holes and prevent rotation of the float member, while permitting it to rise and fall with the fluid in which it floats. The annular sleeve 18 also carries a pin 22, extending completely across the tube 17 and entering the slots 15 of the tubular part of the valve member. The arms 19 and sleeve 18 constitute a cross-piece at the lower end of the float member, and the location of this cross-piece and the concentric arrangement of the float and valve members and diametrically opposite arrangement of the helical slots assure a symmetrical transmission of power and an easy movement of the parts.

In the position of the parts shown in Fig. 1 the tank has been filled to its predetermined capacity and the float is raised and the inlet-valve closed. The height of the fluid-level $b$ is such that all engaging parts are immersed in water and lubricated and protected thereby. Upon the opening of the outlet-valve of the tank, which is not shown in the drawings, but which may be of any well-known or suitable construction, the water-level in the tank will fall, thereby lowering the float member 16 on the guide-rods 8 and lowering the pin 22 in the helical slots 15 of the tubular part 14 of the valve member, and thereby causing this member to rotate and its lower threaded end 12 to screw upward in its threaded socket 17, thereby permitting the inlet-valve 9 10 to be lifted from its seat by the pressure at the inlet. This inlet-valve will remain open until the inflowing water has again filled the tank to the normal level, when the rise of the float will have caused the valve member to be screwed down sufficiently to close the inlet-valve.

It will be noted that the valve member receives an upward as well as rotative movement when the float falls and a downward as well as rotative movement when the float rises by reason of arrangement of the helices of the threaded part 12 and of the helical slots 15 in the same direction; but the latter is of so much greater pitch than the former that the movement of the valve member in the opposite direction to that of the float member only augments the rotative effect of the rise and fall of the float member.

In the embodiment of my invention in a steam-trap (shown in Fig. 3) the casing comprises a closed reservoir or tank $a'$, the case or lower head $c$ of which has an outlet-chamber $e$ formed therein. The inlet-pipe $d$ enters the tank near its upper end, and the outlet-pipe $f$ extends out from the outlet-chamber. The upper surface of the base or lower head $c$ of the tank is inclined downward toward the center and is provided with a threaded boring receiving a threaded plug $1'$, which is provided with a shoulder $3'$ and has a bridge-piece $6'$ thereon, the threaded plug $1'$ having the seat for the controlling-valve on its lower face and the bridge-piece $6'$ having a threaded socket $7'$ receiving the threaded stem $12'$ of the valve member. The valve-plug $9'$ is of conical form and of yielding or elastic material and is carried by a bolt $11'$, which is screwed up into the valve-stem $12'$ and carries a jam-nut 30, pinned thereto, and the lower head of the bolt $11'$ has a diametric slot for a screw-driver, so that the valve-plug and bolt may be inserted or removed through the opening shown as provided in the lower wall of the outlet-chamber and closed by a screw-cap 29. Above the threaded part $12'$ of the valve-stem is a cylindrical part $14'$, having diametrically opposite helical grooves or slots $15'$, and the float member carries a nut $18'$, which has tongues $22'$ entering these helical slots. The nut $18'$ is carried on a spider and ring $19'$, which is secured to the lower end of the inverted cup $16'$, and a fork $20'$, projecting outwardly from the ring, engages a vertical guide-tongue $8'$, formed on the inner wall of the tank $a'$, so as to prevent rotation of the float member, while permitting the float member to rise and fall with the liquid in the tank. A petcock 31 is provided at the top of the tank and a blow-off valve 25 at the bottom of the tank. The blow-off valve is located at the lower part of a pocket in the base $c$. Its opening leads into the outlet-chamber $e$, and its stem is carried in a bonnet 26, screwed into the outer side wall of the base $c$. In this steam-trap construction the closing of the valve is effected by downward movement of the float; but as the valve closes by upward movement the respective directions of movement are the same as in the flush-tank construction.

It is obvious that various other modifications may be made in the constructions shown and above particularly described within the spirit and scope of my invention.

What I claim, and desire to secure by Letters Patent, is—

1. Means for controlling the fluid-level of a reservoir comprising a float, a valve member, a stationary member having a helical engagement with the valve member and supporting the member to travel axially in a substantially vertical direction, when rotated, and a valve controlled by the valve member, the float having a direct connection with the valve member whereby the rise and fall of the float will operate the valve member in its support and control the valve.

2. Means for controlling the fluid-level in a reservoir comprising a float member, guiding means for restraining the rotation thereof, a rotatable valve member, the float member and valve member having a helical engagement, and a valve controlled by the valve member.

3. Means for controlling the fluid-level of a reservoir comprising a hollow inverted float member, guiding means for restraining the rotation thereof, a rotatable valve member arranged to enter within the hollow float member, the float member and valve member having a helical engagement, and a valve controlled by the valve member.

4. Means for controlling the fluid-level of a reservoir comprising a float member, guiding means for restraining the rotation thereof, a rotatable valve member, the float member and valve member having a helical engagement, a threaded part on the valve member and a threaded stationary socket therefor, and a valve controlled by the valve member.

5. Means for controlling the fluid-level of a reservoir comprising a hollow inverted float member, guiding means for restraining the rotation thereof, a rotatable valve member arranged to enter within the hollow float member, the float member and valve member having a helical engagement, a threaded part on the valve member and a threaded stationary socket therefor, and a valve controlled by the valve member.

6. Means for controlling the fluid-level of a reservoir comprising a float member, guiding means for restraining the rotation thereof, a rotatable valve member, the float member and valve member having a helical engagement, whereby the rise and fall of the float member is converted into rotary movement of the valve member, a stationary socket for the valve member, the valve member and socket having a helical engagement of a pitch considerably less than that of the helical engagement of the float member and valve member, whereby the rotary movement of the valve member is converted into a rise and fall of the valve member of considerable less extent than the rise and fall of the float member, and a valve controlled by the valve member.

7. Means for controlling the fluid-level of a reservoir comprising a hollow inverted float member, guiding means for restraining the rotation thereof, a rotatable valve member arranged to enter within the hollow float member and having helical engaging parts, the float member having means coacting with the helical engaging parts of the valve member to convert the rise and fall of the float member into rotary movement of the valve member, a stationary socket for the valve member, the valve member and socket having helical engaging parts of a pitch in the same direction as and considerably less than that of the helical parts engaged by the float member, whereby the rotary movement of the valve member is converted into a rise and fall of the valve member with augmentation of the rotative effect due to the rise and fall of the float member, and a valve controlled by the valve member.

8. The combination, with a fluid-reservoir, of a hollow inverted float having a cross-piece at its lower end, guiding means for restraining the rotation of the float, a rotatable valve member arranged to enter within the hollow float, the cross-piece of the float and the rotatable valve member having a helical engagement, and a valve controlled by the valve member.

9. The combination with a fluid-reservoir, of a hollow inverted float having a cross-piece at its lower end, guiding means for restraining the rotation of the float, a rotatable valve member having helical slots, the cross-piece of the float having projecting means engaging such helical slots, and a valve controlled by the valve member.

10. The combination with a fluid-reservoir, of a hollow inverted float having a cross-piece at its lower end, guiding means for restraining the rotation of the float, a rotatable valve member having helical slots, the cross-piece of the float having projecting means engaging such helical slots, a threaded part on the valve member and a threaded stationary socket therefor, and a valve controlled by the valve member, substantially as set forth.

11. The combination with a fluid-reservoir, of a hollow inverted float having a cross-piece at its lower end, guiding means for restraining the rotation of the float, a rotatable valve member having helical slots, the cross-piece of the float having projecting means engaging such helical slots, whereby the rise and fall of the float is converted into rotary movement of the valve member, a stationary socket for the valve member, the valve member and socket having helical engaging parts of a pitch in the same direction as but considerably less than that of the helical slots, whereby the rotary movement of the valve member is converted into a rise and fall of the valve member with augmentation of the rotative effect due to the rise and fall of the float, and a valve controlled by the valve member.

12. The combination with a fluid-reservoir, of a float consisting of a hollow inverted cup with a centrally-piercing tube and a cross-piece connecting the cup and tube at their lower ends, guiding means for restraining the rotation of the float, a rotatable valve member arranged to telescope within the tube of the float and having helical slots, the cross-piece of the float having projecting means engaging such helical slots, a stationary threaded socket for the valve member and a threaded part on the valve member engaging such threaded socket, and a valve controlled by the valve member, substantially as set forth.

In testimony whereof I have affixed my signature in presence of two witnesses.

JOHN B. WARING.

Witnesses:
HENRY D. WILLIAMS,
HERBERT H. GIBBS.